United States Patent [19]

Busch et al.

[11] Patent Number: 4,818,119

[45] Date of Patent: Apr. 4, 1989

[54] HOT BEARING WARNING BOLT

[75] Inventors: Theodore Busch, Minneapolis, Minn.; Clark E. Johnson, Jr., Denver, Colo.

[73] Assignee: Rastech, Inc., Minneapolis, Minn.

[21] Appl. No.: 80,979

[22] Filed: Aug. 3, 1987

Related U.S. Application Data

[63] Continuation-in-part of Ser. No. 865,209, May 19, 1986, abandoned.

[51] Int. Cl.[4] .................... G01K 1/14; G01K 11/06
[52] U.S. Cl. .................... 374/208; 374/159; 374/205; 116/217; 116/218
[58] Field of Search ............ 374/159, 160, 205, 206, 374/207, 208; 116/217, 218, 221

[56] References Cited

U.S. PATENT DOCUMENTS

| 1,451,044 | 4/1923 | Leonard | 116/218 |
| 1,509,110 | 9/1924 | Potter | 116/218 |
| 2,938,384 | 5/1960 | Soreng et al. | 116/217 |
| 3,280,629 | 10/1966 | Kliewer | 116/218 |
| 3,377,980 | 4/1968 | Schindel | 116/218 |
| 3,442,249 | 5/1969 | Jamison et al. | 116/217 |
| 3,548,780 | 12/1970 | Kliewer | 116/218 |
| 3,626,897 | 12/1971 | Kliewer | 116/218 |
| 3,724,360 | 4/1973 | Kliewer et al. | 116/217 |
| 3,820,499 | 6/1974 | Kliewer et al. | 116/217 |
| 3,877,411 | 4/1975 | MacDonald | 374/162 |
| 4,083,364 | 4/1978 | Kelly et al. | 116/217 |

FOREIGN PATENT DOCUMENTS

| 0620354 | 5/1961 | Canada | 116/218 |
| 3229020 | 2/1984 | Fed. Rep. of Germany | 116/218 |
| 0604144 | 2/1979 | U.S.S.R. | 116/218 |

OTHER PUBLICATIONS

Donald S. Wilson & John L. Frarey, Shaker Research Corporation, Investigations of a Bearing Fault Detector, for NASA, George C. Marchall Space Flight Center, Jan. 1976.

W. D. Waldron et al., Shaker Research Corporation, Improvement of Railroad Roller Bearing Test Procedures and Development of Roller Bearing Diagnostic Techniques, vol. 1, Mar. 1982.

Shaker Research Corp., Wayside Derailment Inspection Requirements Study for Railroad Vehicle Equipment, Prepared for Federal Railroad Administration, May 1977.

Primary Examiner—Allan N. Shoap
Assistant Examiner—Thomas B. Will
Attorney, Agent, or Firm—Vidas & Arrett

[57] ABSTRACT

A temperature warning device for monitoring the temperature of an article and for providing a dependable signal that a preselected temperature has been reached. The device includes an axially extending bore into which a heat responsive element, a driver, and a sensing indicator are arranged. The bore is normally sealed by a closure plug to prevent failure due to contaminants. Upon reaching a preselected temperature the element exerts force against the driver which in turn forcibly removes the closure plug, exposing the indicator.

25 Claims, 2 Drawing Sheets

HOT BEARING WARNING BOLT

This application is a Continuation-In-Part of U.S. patent application Ser. No. 865,029 filed May 19, 1986, now abandoned.

FIELD OF THE INVENTION

This invention relates to temperature responsive indicators and more particularly to a bolt which provides a dependable indication that a high temperature has been reached.

BACKGROUND OF THE INVENTION

A wide variety of devices may be severely damaged if an operation begins to generate heat which is not detected until damage has occurred. Therefore, equipment temperatures are preferably monitored in a wide variety of processes and applications. An increase in temperature which is sensed may be indicative of a bearing failure, a breakdown of the lubricant system or may merely mean that equipment should be cooled so that it continues to operate at a given temperature range. Systems have previously been available in which multiple sensors are all wired together to a central location where it is possible to monitor the temperature of each station. Such systems are, however, quite expensive since either an operator or computer must be used to evaluate the information obtained from the sensors. This situation is exacerbated when the devices being monitored are in motion relative to the location of the display or control equipment such as the journal bearings of railroad cars. Also, some automatic systems which employ a computer may cause an automatic shut down if one sensor sends a high temperature reading whereas in some situations that may not be desirable. In the case of a railroad, sudden stopping of an entire train because of a hot journal box may cause severe damage to the train and the cargo.

Some of the prior art devices have indicated high temperature by merely providing a visual indicator before a preselected temperature is reached. In some forms a spring is released when a fusible alloy reaches its melting temperature. An internal member then protrudes from a bolt head. Such methods are, however, unreliable because bolt heads are typically exposed to a wide variety of soil and contaminants. In some cases, they may prevent exposure of the indicator member completely. In other cases, they may prevent accurate calibration.

BRIEF SUMMARY OF THE INVENTION

The high temperature warning device of the invention includes a body which may be threaded into a cavity of the equipment whose temperature is to be monitored. The body includes an axially extending bore having an opening through the head. The device may also function as a bolt providing holding power or may merely be threaded into a bore to provide high temperature warning.

The device includes a heat detecting mechanism. The driver normally resides within the bore at normal temperatures. When the preselected temperature is reached the heat detecting mechanism causes the driver to be expelled outwardly from the bore. The driver in turn exerts a substantial force against a closure plug mechanism which ejects same free from the device. The closure plug normally serves to seal the bore from outside contaminants. After the closure plug is ejected, the interior of the bore is exposed such that an indicating means is able to signal that the preselected temperature has been reached.

Preferably, the heat detecting mechanism should extend to its maximum travel almost immediately upon reaching the preselected temperature. Once expanded, the driver should preferably not retract upon cooling.

The heat detecting mechanism may take many forms and functions to respond to an increase in temperature and to exert force against the driver. The heat detecting mechanism may utilize a curved piece of bimetal which straightens upon heating to press against the driver. Alternatively, the bore may include chemicals which react and expand toward the driver when the preselected temperature is reached. Preferably, the heat detecting mechanism includes a spring and a solidified fusible alloy which normally holds the spring in a compressed state. Upon reaching the preset temperature, the alloy melts allowing the spring to exert force against the driver which in turn ejects the closure plug.

In one form, the driver includes a short pin member which engages the closure plug shortly before the end of its travel caused by the spring. The hammer-like blow so obtained forcibly removes the closure plug even if the device is covered with dirt, grime and the like. The bore of the device is then exposed and the indicating mechanism therein is able to provide a signal that the equipment next to the device is hot. Preferably, a simple indicator such as a retroflective disk is employed which provides an easily seen visual signal that the device has been tripped.

Instead of relying on the hammer-like blow achieved by the construction above, a much more powerful spring or other ejecting mechanism may be used either alone or in conjunction with the short pin member.

BRIEF DESCRIPTION OF THE DRAWINGS

A detailed description of the invention is hereafter described with specific reference being made to the drawings in which.

DETAILED DESCRIPTION OF THE INVENTION

Example 1

Figure 1:
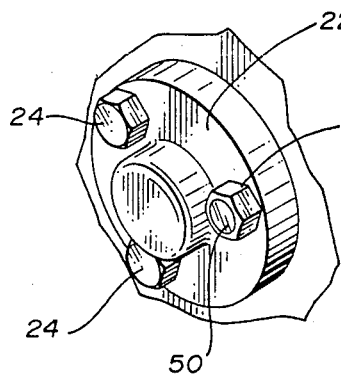
FIG. 1 is a perspective view of a bearing journal bearing bolt device of the invention in a normal condition.

With particular reference being made to FIGS. 1-5, the temperature responsive device 10 of the invention is shown in the shape of a bolt having threads 12, a head 14 and an axially extending bore 16 which has an opening through head 14. Inside bore 16 a spring 18 is normally held in a compressed state by being embedded in solidified fusible alloy or solder 20. A typical fusible alloy is Cerotru alloy from Cerro Metal Products which melts as 250 degrees F (121 degrees C.).

Figure 2:
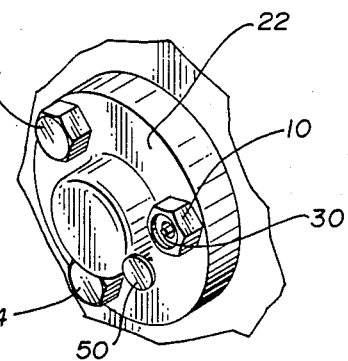
FIG. 2 is a perspective view of the journal bearing bolt device of FIG. 1 in a temperature warning condition.
Figure 3:
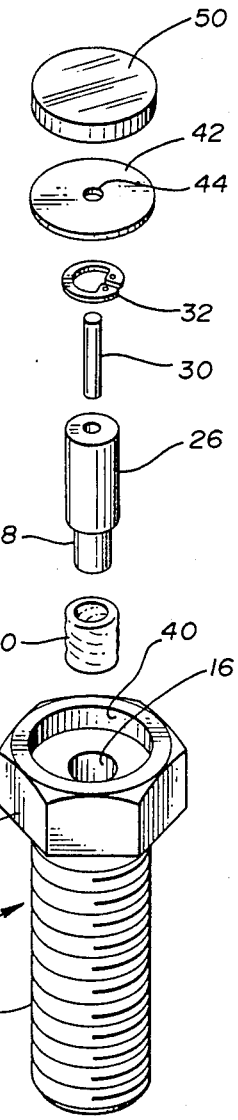
FIG. 3 is an exploded view of a hot bearing warning device of the invention in which a spring and fusible alloy are utilized.

In FIGS. 1 and 2 device 10 is shown as one of three bearing journal bolts holding a bearing cover plate 22 onto the wheel of a railroad car. The conventional bolts are shown as reference Number 24.

A driver 26 is loosely fitted within bore 16 and includes a shoulder 28 which rests against spring 18 as shown. The other end of driver 26 is preferably in the shape of a short pin 30. In the normal, non-heated position, the end of pin 30 is well back from the plane defined by the top of bolt head 14.

A lock ring 32 fitted into a recess 34 holds the driver 26 within bore 16 even in the hot warning condition. Bore 16 preferably includes an enlarged portion 40 in which a retroflective disk 42 having a central hole 44 is positioned.

Figure 4:
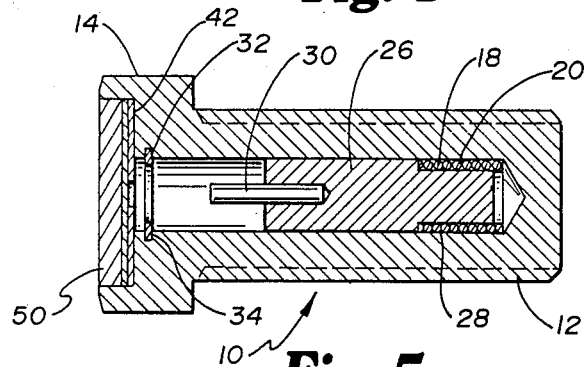
FIG. 4 and 5 are cross-sectional views of the device of FIG. 3 in a normal and temperature warning condition respectively.

A closure plug 50 is fitted into enlarged portion 40 as shown in FIGS. 1 and 4 so as to effectively seal the interior of device 10 from any contaminants which may affect its performance. The top face of plug 50 is typically of a neutral color and should be flush with head 14. In the unfired condition, device 10 threaded into a journal box would provide no visible signal.

Normal dirt, grease, and the like which accumulates around journal boxes may cover bolts 24 or closure plug 50 so as to completely obscure same. However, the internal mechanisms of device 10 are maintained in a clean, operable manner due to the closure plug 50.

If the temperature around device 10 increases such that alloy 20 melts, spring 18 forces driver 26 up towards closure plug 50. All of the force is exerted against plug 50 by the small cross-sectional area of pin 30 which causes plug 50 to be ejected free from device 10. The normal gap between the end of pin 30 and plug 50 allows kinetic energy to build as driver 26 travels to provide a hammer-like blow to the closure plug. Even a heavily dirt-encased closure plug will be forcibly removed when struck by the clean mechanism within device 10.

After closure plug 50 is ejected, pin 30 extends beyond head 14 and retroreflective disk 42 is exposed. The large surface area of disk 42 makes it highly visible in contrast to the normal bolt-like appearance of the device.

Figure 5:
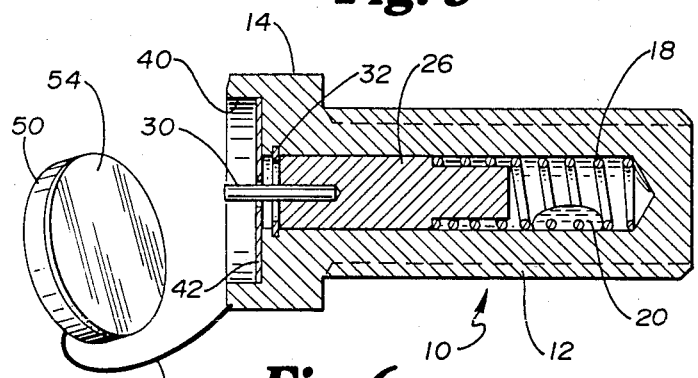

Closure plug 50 may alternatively be tethered to head 14 by a fine line 52, shown in FIG. 5 only for purposes of clarity. In such configurations, the underside 54 of closure plug 50 may also be brightly colored or reflective so as to provide yet another highly visual indication that high temperatures have been reached.

Alternatively, the warning signal may be non-visual which is picked up only after the closure plug has been ejected. By way of example only and not as a limitation, such warning signals may be provided by inductive magnets within bore 16 which are read by an external pickup unit only after plug 50 is ejected.

Example 2

Figure 6:
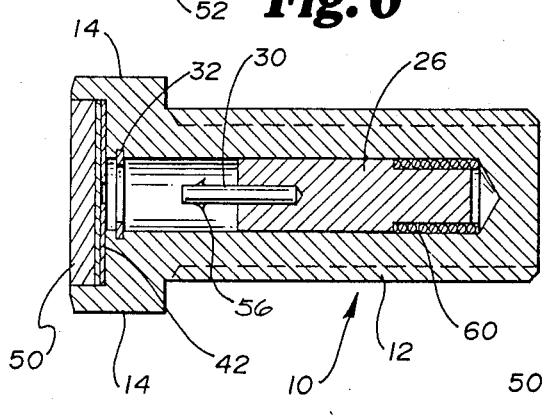
FIG. 6 is a cross-sectional view of an alternative embodiment of the invention employing a shape memory alloy.

The embodiment shown in FIG. 6 is an alternative to the preferred form of the invention shown in FIGS. 1-5. Like reference numerals are employed for elements which are or may be identical to those described above. In this embodiment, a shape memory alloy element 60 is employed instead of spring 18 and alloy 20. Element 60 may be a simple bimetallic curved element or a spring shaped element comprised of a shape memory alloy such as the type available from Memory Metals, Inc. of Stamford, Conn. Element 60 maintains a compact configuration until a preselected temperature is reached. Element 60 greatly expands at the higher temperature which forces pin 30 against closure plug 50. Preferably, driver 26 is constructed to prevent its retraction back into bore 16 upon cooling. As shown, pin 30 includes barbs 56 which will pass through disk 42 and will prevent retraction.

Example 3

Figure 7:
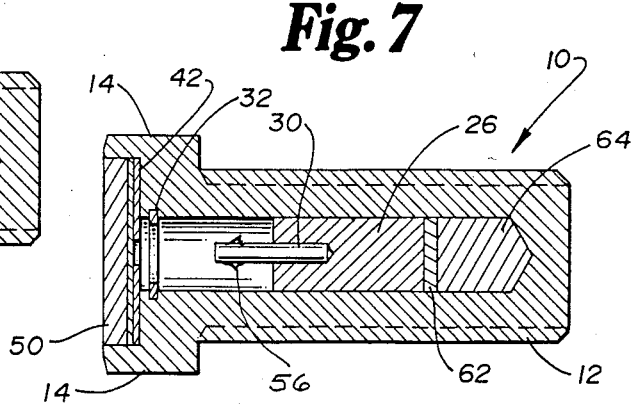
FIG. 7 is a cross-sectional view of an alternative embodiment in which chemicals are normally sealed within the device.

Yet another embodiment of the invention is shown in FIG. 7. Device 10, as shown in FIG. 7, employs a chemical reaction to force driver 26 against closure plug 50. A suitable seal 62 between driver 26 and chemicals 64 maintains the chemicals 64 within bore 16.

The chemicals 64 are chosen such that upon reaching a preselected temperature a reaction takes place which increases the volume the chemicals occupy. This expansion forces seal 62 and driver 26 against closure plug 50. In addition to chemicals which normally react and expand at preselected temperatures, chemical combinations may be employed which involve a physical separation of the chemicals until the preselected temperature is reached at which time the physical barrier melts or the like. One component may be encapsulated in a material that melts at reaching the desired temperature, allowing the other component to mix and react and expand to expel the closure plug. A mechanism to prevent retraction of pin 30 upon cooling such as barbs 56 may be employed.

Example 4

Figure 8:
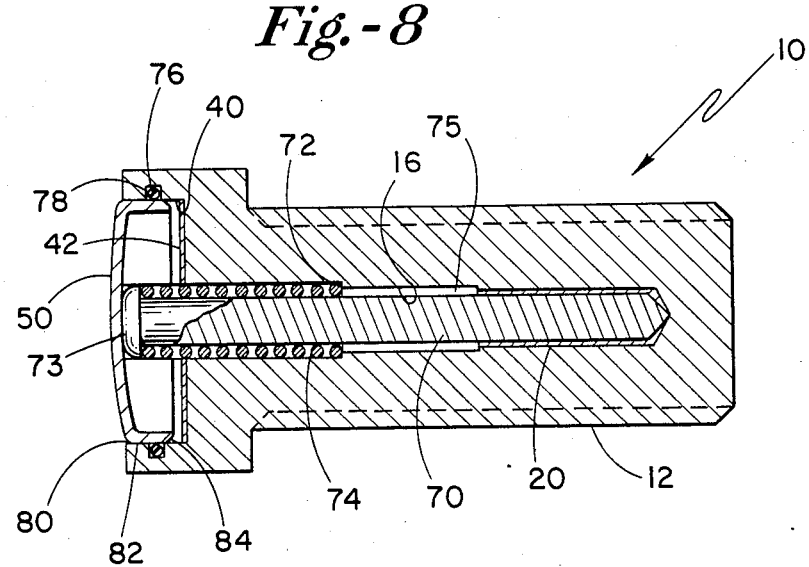
FIG. 8 is a cross-sectional view of an alternative embodiment showing the driver attached to the sealed cap.

Another embodiment of the invention is shown in FIG. 8. Device 10, as shown in FIG. 8, includes a driver 70 within bore 16. Bore 16 includes a shoulder 72 against which a spring 74 rests as shown. A second shoulder 75 provides an enlarged area above the region in which the fusible alloy 20 secures the driver in place. The enlarged area provides space for the liquified alloy to flow into. Driver 70 bears against the inside of closure plug 50. Alternatively, driver 70 may be secured to closure plug 50 by welding or other suitable manner. If so attached, the spring 74 would push the closure plug 50 and attached driver 70 from device 10 except for the hardened fusible alloy 20 which secures the driver to the device. Upon heating, the alloy melts and the spring expels the closure plug and driver from the device. A tether may be secured to the closure plug and exterior of device 10 to hold the expelled plug and driver to the overheated device. As shown, driver 70 includes a head 73 against which the spring rests. In this form, the driver and closure plug expelled as separate components. Again, a tether may be provided.

As shown in the previous figure, a good seal from the elements may be achieved by a tight fit of the plug into enlarged portion 40. A superior seal is provided in the device of FIG. 8. An O-ring seal 76 resides within an annular groove 78. The O-ring forms a seal against closure plug 50. The seal prevents grease and dirt on the exterior of the bearings from contaminating the retroflective disk 42 and moving parts.

As described previously, prior art devices have failed since no matter how good the signal, the device fails if the signal is not visible after over-heating. Even oxidation may cause reflective surfaces to fail to function as desired. Therefore, the seals provided by the closure plugs of the invention are vital to insure reliability.

In lieu of or in addition to O-ring seal 76, a sealant 80 may be positioned between the device and closure plug 50. Sealant 80 may be a silicone sealing compound or an anaerobic sealant which has insufficient breakaway strength to prevent spring 74 from expelling the plug. In forms having an O-ring, the edge 82 of the closure plug 50 preferably has a chamfer 84 as shown which prevents damage to the O-ring.

In considering this invention it must be remembered that the disclosure is illustrative only and that the scope of the invention is determined by the appended claims.

What is claimed is:

1. A high temperature warning device adapted to replace a standard structural bolt used to hold a bearing cover plate of a bearing journal box of a roller bearing mounted on an axle by threading into a threaded bore of the journal box to perform the dual purpose of holding said cover to said journal box and providing a high temperature warning, said device comprising:
  (a) a body having a threaded shaft whose threads matingly engage with said threaded bore normally holding said standard structural bolt of said bearing journal, and a bolt head having wrench gripping faces and having wrench gripping faces and constructed and arranged such that said device may be threaded into a threaded bore of a bearing journal box;
  (b) said body including an axially extending bore having an opening through said head, said bore leaving the majority of the body intact;
  (c) heat detecting means positioned with said bore of said body, said heat detecting means constructed and arranged such that upon being heated to a preselected temperature a force is exerted outwardly from said bore toward said opening in said head;
  (d) closure plug means for normally sealing the bore of said device without covering the wrench gripping faces of the bolt head so as to enclose and protect said heat detecting means therewithin, said closure plug means being constructed and arranged such that force from said heat detecting means will cause said closure plug means to be expelled from the device thereby exposing a signal means; and
  (e) said signal means producing a signal when said closure plug means is expelled.

2. The device of claim 1 wherein said signal means is a visual indicator including a retroreflective disk member within the bore of said device which is exposed only when said closure plug means is ejected from the body.

3. The device of claim 1 wherein said heat detecting means includes an ejecting mechanism and a driver positioned within said bore, said driver being loosely journalled within said bore such that force transmitted against said driver by said ejecting mechanism is transmittable as a hammer-like blow to eject the closure plug means.

4. The device of claim 3 wherein said driver is normally spaced from said closure plug means such that when force is applied to said driver by said ejecting mechanism, said driver has a greater kinetic energy when it impacts against said closure plug to forcibly eject same.

5. The device of claim 3 wherein said heat detecting means further includes means for holding said ejecting mechanism and driver within the bore of said body until a preselected temperature is reached.

6. The device of claim 5 wherein said holding means is a fusible alloy.

7. The device of claim 1 wherein said ejecting mechanism is selected from the group consisting of bimetallic members, springs, and compositions exhibiting exothermic reactions at said preselected temperatures.

8. The device of claim 7 wherein said closure plug means comprises a plug member which prevents contaminants from contacting said heat detecting means and signal means until said closure plug is expelled by said heat detecting means.

9. The device of claim 8 wherein said closure plug means further includes tether means for holding an expelled closure plug to said body.

10. The device of claim 9 wherein said closure plug includes a reflective covering on its underside, normally unexposed surface.

11. A high temperature warning device adapted to replace a standard structural bolt of a railroad bearing journal box of a roller bearing mounted on an axle by threading into a threaded bore of the journal box to perform the dual purpose of holding a bearing cover plate and warning of high temperatures within the journal box adjacent the bearing, said device comprising:
  (a) a body having a threaded shaft whose threads are constructed and arranged to matingly engage with said threaded bore of said journal box and a bolt head such that said device may be threaded into a threaded bore of a bearing journal box;
  (b) said body having an axially extending bore having an opening through said head;
  (c) the opening in said head being sealed by a closure plug member;
  (d) said closure member bearing against a pin member which extends into the axial bore within said body;
  (e) spring means in engagement with said pin member and being arranged within the bore of said body such that said spring means would act to eject said closure plug and pin member from said body;
  f) heat detecting means positioned within the bore of said body, said heat detecting means being constructed and arranged to hold said pin member to said body until said warning device is heated to a preselected temperature at which time said spring means would eject said closure plug and pin member from the body; and
  (g) signal means for providing a signal when said closure plug member is expelled.

12. The device of claim 11 wherein said signal means is a visual indicator including a retroreflective disk member within the bore of said device which is exposed only when said closure plug means is ejected from the body.

13. The device of claim 11 wherein said heat detecting means is a fusible alloy.

14. The device of claim 11 wherein the bore of said body is sealed from the exterior by the seal created by an O-ring which engages with an outer periphery of said closure plug member.

15. The device of claim 14 wherein said closure plug member is further sealed to said body by means of a sealant compound.

16. The device of claim 15 wherein said sealant is a silicone compound.

17. The device of claim 11 wherein said closure member is attached to said pin member and said spring means is in engagement with said closure member.

18. In combination, a high temperature warning bolt and a railroad bearing journal box, said journal box including a plurality of standard structural bolts threaded into a plurality of threaded bores, the combination including said journal box in which one of said standard bolts has been replaced with said high temperature warning bolt, said warning bolt comprising:
(a) a body having a threaded shaft whose threads matingly engage with one of said threaded bores normally holding one of said standard structural bolts of said bearing journal and a bolt head having wrench gripping faces and constructed and arranged such that said bolt may be threaded into one of said threaded bores of said bearing journal box;
(b) said body including an axially extending bore having an opening through said head;
(c) heat detecting means positioned with said bore of said body, said heat detecting means constructed and arranged such that upon being heated to a preselected temperature a force is exerted outwardly from said bore toward said opening in said head;
(d) closure plug means for normally sealing the bore of said body without covering the wrench gripping faces of the bolt head so as to enclose and protect said heat detecting means therewithin, said closure plug means being constructed and arranged such that force from said heat detecting means will cause said closure plug means to be expelled from the bolt thereby exposing a signal means; and
(e) said signal means producing a signal when said closure plug means is expelled.

19. The bolts of claim 18 wherein said signal means is a visual indicator including a retroreflective disk member within the bore of said device which is exposed only when said closure plug means is ejected from the body.

20. The bolts of claim 18 wherein said heat detecting means is a fusible alloy.

21. The bolt of claim 18 wherein the bore of said body is sealed from the exterior by the seal created by an O-ring which engages with an outer periphery of said closure plug means.

22. The bolt of claim 18 wherein said closure plug means is further sealed to said body by means of a sealant compound.

23. The bolt of claim 22 wherein said sealant is a silicone compound.

24. In combination, a high temperature warning bolt and a railroad bearing journal box, said journal box including a plurality of standard structural bolts threaded into a plurality of threaded bores, the combination including said journal box in which one of said standard bolts has been replaced with said high temperature warning bolt, said warning bolt comprising:
(a) a body having a threaded shaft and a bolt head such that said bolt may be threaded into one of said threaded bores of said bearing journal box;
(b) said body having an axially extending bore having an opening through said head;
(c) the opening in said head being sealed by a closure plug member;
(d) said closure member bearing against a pin member which extends into the axial bore within said body;
(e) spring means in engagement with said pin member and being arranged within the bore of said body such that said spring means would act to eject said closure plug and pin member from said body;
(f) heat detecting means positioned within the bore of said body, said heat detecting means being constructed and arranged to hold said pin member to said body until said warning device is heated to a preselected temperature at which time said spring means would eject said closure plug and pin member from the body; and
(g) signal means for providing a signal when said closure plug member is expelled.

25. The bolt of claim 24 wherein said closure member is attached to said pin member and said spring means is in engagement with said closure member.

* * * * *